United States Patent [19]

Ogawa et al.

[11] Patent Number: 5,706,350
[45] Date of Patent: Jan. 6, 1998

[54] STEREOPHONIC DECODER

[75] Inventors: Atsusi Ogawa; Tsuneyuki Murayama, both of Kanagawa-ken, Japan

[73] Assignee: Kabushiki Kaisha Toshiba, Kawasaki, Japan

[21] Appl. No.: 706,713

[22] Filed: Sep. 6, 1996

[30] Foreign Application Priority Data

Sep. 8, 1995  [JP]  Japan .................. P07-231623

[51] Int. Cl.⁶ .................................. H04H 5/00
[52] U.S. Cl. .......................... 381/15; 455/245.1
[58] Field of Search ................. 381/15, 16, 1, 381/2; 455/309, 312, 337, 293, 214, 245.1, 246.1

[56] References Cited

U.S. PATENT DOCUMENTS

| | | | |
|---|---|---|---|
| 4,371,747 | 2/1983 | Hilbert . | |
| 4,377,728 | 3/1983 | Hilbert | 381/15 |
| 4,550,424 | 10/1985 | Cheng et al. | 381/15 |
| 4,679,237 | 7/1987 | Ecklund | 381/15 |
| 5,359,661 | 10/1994 | Manlove et al. | 381/15 |

*Primary Examiner*—Curtis Kuntz
*Assistant Examiner*—Ping W. Lee
*Attorney, Agent, or Firm*—Oblon, Spivak, McClelland, Maier & Neustadt, P.C.

[57] ABSTRACT

A compatible quadrature type AM sterophobic decoder including an enveolpe detector for providing a current output signal and a combination of a VCA and a synchronous detector for providing a current output signal.

The combination of the VCA and the synchronous detector is controlled by a feedback signal from an adder which adds the current output signal of the envelope detector and the inverting current output signal of the conbination of the VCA and the synchronous detector.

7 Claims, 8 Drawing Sheets

STEREOPHONIC DECODER

BACKGROUND OF THE INVENTION

1. Field of the Invention

The present invention relates to an AM stereophonic decoder for applying in an AM stereophonic broadcasting receiving apparatus.

In particular, this invention relates to an AM stereophonic decoder for using in a compatible quadrature type AM stereophonic broadcasting receiving apparatus.

2. Discussion of the Background

A decoder for a compatible AM stereophonic signal utilizes an amplifier and a feedback loop from the amplifier output to control the output of a multiplier circuit which is one input to the amplifier. The conventional decoder comprised of a voltage output type amplifier and a voltage output type multiplier.

FIG. 7 shows the conventional AM stereophonic decoder for using in a compatible quadrature type AM stereophonic receiver. A compatible AM stereophonic broadcasting signal is received and detected in an RF stage 10, converted into an intermediate frequency in an IF stage 12, and coupled to an in-phase synchronous detector 14 and a quadrature synchronous detector 16. A local oscillator 18 output is coupled directly to the in-phase synchronous detector 14, and through a 90° phase shifter 20, to the quadrature synchronous detector 16. The output signal from the in-phase synchronous detector 14 is (1+L+R) cos θ and the output signal from the quadrature synchronous detector 16 is the quadrature signal (L−R) cos θ.

The output of the IF stage 12 is also coupled to an envelope detector 22. The output of the envelope detector 12 is a compatible monophonic signal which corresponds to a voltage of (1+L+R) component of the IF signal. The output (1+L+R) signal is supplied to a matrix circuit 24, and is also coupled to one input of a difference voltage detecting circuit 26. The inverting input of the difference voltage detecting circuit 26 is coupled from the output of a first voltage-controlled amplifier (hereinafter referred to as VCA), and the output of the difference voltage detecting circuit 26 is coupled back to an input of the first VCA 28. The second input of the first VCA 28 comes from the in-phase synchronous detector 14. The combination of the first VCA 28, the difference voltage detecting circuit 26 and the feedback loop forces the output signal of the first VCA 28 to become 1+L+R which could be coupled the matrix circuit 24 in place of the output signal from the envelope detector 22.

The output signal of the amplifier 26 is also coupled to an input of a second VCA 30. The other input of the second VCA 30 is the quadrature signal (L−R) cos θ from the quadrature synchronous detector 16. Thus the second VCA 30 output becomes L−R. This difference signal is coupled to the matrix circuit 24 which outputs the original left (L) and right (R) information signals.

As explained, the conventional AM stereophonic decoder utilizes the feedback signal from the difference voltage detecting circuit 26 for controlling the output voltage levels of the first and second VCA circuits.

FIG. 8 shows an example of the difference voltage detecting circuit for using the conventional AM stereophonic decoder. As shown in FIG. 8, the difference voltage detecting circuit 26 includes a pair of NPN transistors Q1 and Q2 which constitutes a differential amplifier. The input voltage to the base side of the transistor Q1 comes from the in-phase synchronous detector through the first VCA, and the inverting input to the base side of the transistor Q2 comes from the envelope detector. A constant current source I1 is coupled between the commonly connected terminal of the emitter sides of the deferential amplifier Q1, Q2 and the earth node (GND) terminal. A pair of transistors Q3 and Q4 are coupled between the source node for supplying a source voltage Vcc and the collector sides 25 of the differential pair of the transistors Q1 and Q2. The NPN transistors Q3 and Q4 are coupled so as to make a current mirror connection. The output signal of the detected difference voltage is supplied to the input terminals of the first and second VCAs 28 and 30 through a PNP transistor Q5.

Due to the construction of the difference voltage detecting circuit as mentioned the above, it was impossible to make the source voltage of the conventional receiver lower. Since the forward voltage between the base and the emitter of the transistor is normally about 0.7 volts, it is impossible to make the source voltage of the receiver around one (1) volt. If the source voltage Vcc is lowered to 1 volt, it needs to make the input voltages to the bases of the differential amplifier extremely lower for operating all transistors in the difference voltage detecting circuit in an outside of a saturation area. When the input voltages to the bases of the differential amplifier become an extremely low, it is impossible to obtain a sufficient circuit characteristic for the AM stereophonic decoder.

Consequently, it was impossible to operate the conventional AM stereophonic decoder at a lower voltage around one volt. Thus it is also impossible for the receiver including the decoder to make the source voltage lower around one volt.

SUMMARY OF THE INVENTION

Accordingly, one object of the present invention is solve the above-mentioned problem and defects of the conventional AM stereophonic decoder.

Another object of the present invention is provide an AM stereophonic decoder for applying in a compatible quadrature type AM stereophonic broadcasting receiving apparatus which can operate at a lower source voltage around one volt.

Further object of the present invention is provide an AM stereophonic decoder which can operate under an electric current mode for achieving an AM stereophonic broadcasting receiver of a low voltage source.

These and other objects are achieved according to the present invention by providing an IF stage for processing a received AM stereophonic signal and supplying the output voltage to an envelope detector and a VCA, the envelope detector for supplying a current output which corresponds to (1+L+R) component of a modulated IF signal to a matrix circuit and one input of an adder, the VCA for supplying an output voltage to an in-phase synchronous detector and also to a quadrature synchronous detector, the in-phase synchronous detector for supplying an inverted electric current which corresponds to −(1+L+R) component of a modulated IF signal to another input of the adder, the quadrature synchronous detector for supplying an electric current output (L−R) to another input of the matrix circuit, the matrix circuit for supplying an left channel signal and a right channel signal, and the adder for supplying a detected difference level between the envelope detector and the in-phase synchronous detector to the VCA through an integrating circuit for converting the output current from the adder into an voltage.

The characteristic feature of the present invention is to control the output level of the VCA by an integrated signal of the output signal from the adder which adds the current output of the envelope detector and the inverting current output of the in-phase synchronous detector.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
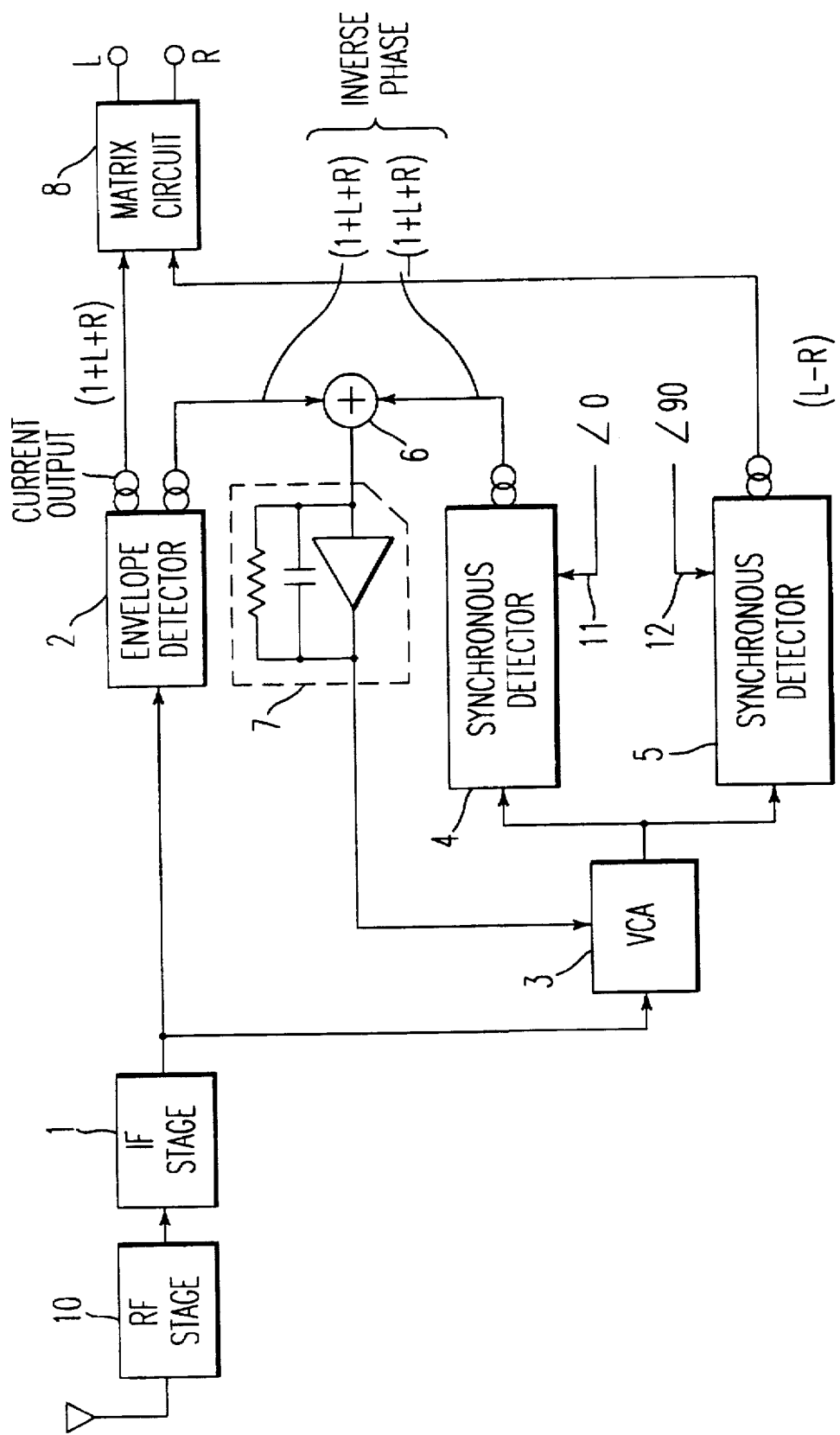
FIG. 1 is a block diagram showing a preferable one embodiment of the compatible quadrature type AM stereophonic decoder according to the present invention.

FIG. 1 shows a preferable first embodiment of the compatible quadrature type AM stereophonic decoder according to the present invention.

A received compatible AM stereophonic signal through an antenna is detected in an RF (Radio Frequency) amplifying stage 10 and is converted to an IF (Intermediate Frequency) signal in an IF amplifying stage 1. The IF signal is supplied to an envelope detector 2 and a voltage-controlled amplifier (VCA) 3.

The envelope detector 2 is a current output type envelope detector for providing a current output which corresponds to a (1+L+R) component for the input IF signal of the AM signal. One output current of (1+L+R) component for the input IF signal of the AM signal is supplied to a matrix circuit 8. The second output current (1+L+R) of the envelope detector 2 is supplied to one input of an adder 6. The second input of the adder 6 comes from an in-phase synchronous detector 4 for adjusting the current output level. The detail is explained later.

The IF signal supplied to the VCA circuit 3 is amplified the voltage level in it, and the output voltage is supplied to both of one input of two synchronous detectors 4 and 5. The respective second input of the synchronous detectors 4 and 5 receives respectively a first and second reference signals 11 and 12 from a local oscillator (not shown).

The first reference signal 11 is directly supplied from a signal oscillator (not shown) to the second input of the synchronous detector 4. Thus, the output voltage of the VCA 3 is in-phase detected by the first reference signal 10 with at ∠0 (angular 0 degree). The in-phase synchronous detector outputs an inverted current output signal which corresponds to a −(1+L+R) cos θ component of the modulated IF signal. The inverting current output −(1+L+R) is supplied to the second input of the adder 6.

As explained before, the first input current (1+L+R) of the adder 6 comes from the envelope detector 2. The second input current −(1+L+R) of the adder is supplied from the in-phase synchronous detector 4. Thus, the first and second input currents to the adder have an inverse phase with each other.

The output voltage of the VCA3 is also detected in the second synchronous detector 5 with the second reference signal 12 which comes from the reference signal oscillator through a 90 degrees (π/2) phase shifter (not shown). Thus the second reference signal has ∠90 (angular 90 degrees).

The output current (L−R) component of the quadrature synchronous detector 5 is supplied to the second input of the matrix circuit 8 for a normal separation and demodulation of a right channel signal R and a left channel signal L from the AM stereophonic signal.

The output current of the adder 6 is supplied to an integrating circuit 7 for converting the output current into a voltage signal. The feed back signal of the integrator 7 is supplied to the second input of the VCA 3 for controlling so as to become an equal level between the output current (L−R) level from the quadrature synchronous detector 5 and the output current (1+L+R) level from the envelope detector 2.

As explained above, the AM stereophonic decoder according to the present invention is characterized in that the VCA is controlled by the feedback loop of the current mode processing. Thus, the characteristic feature of the present invention is to control the VCA by the feedback signal which is produced by the current mode processing of the combination of the current output type envelope detector, the current output type synchronous detector and the adder.

Figure 2:
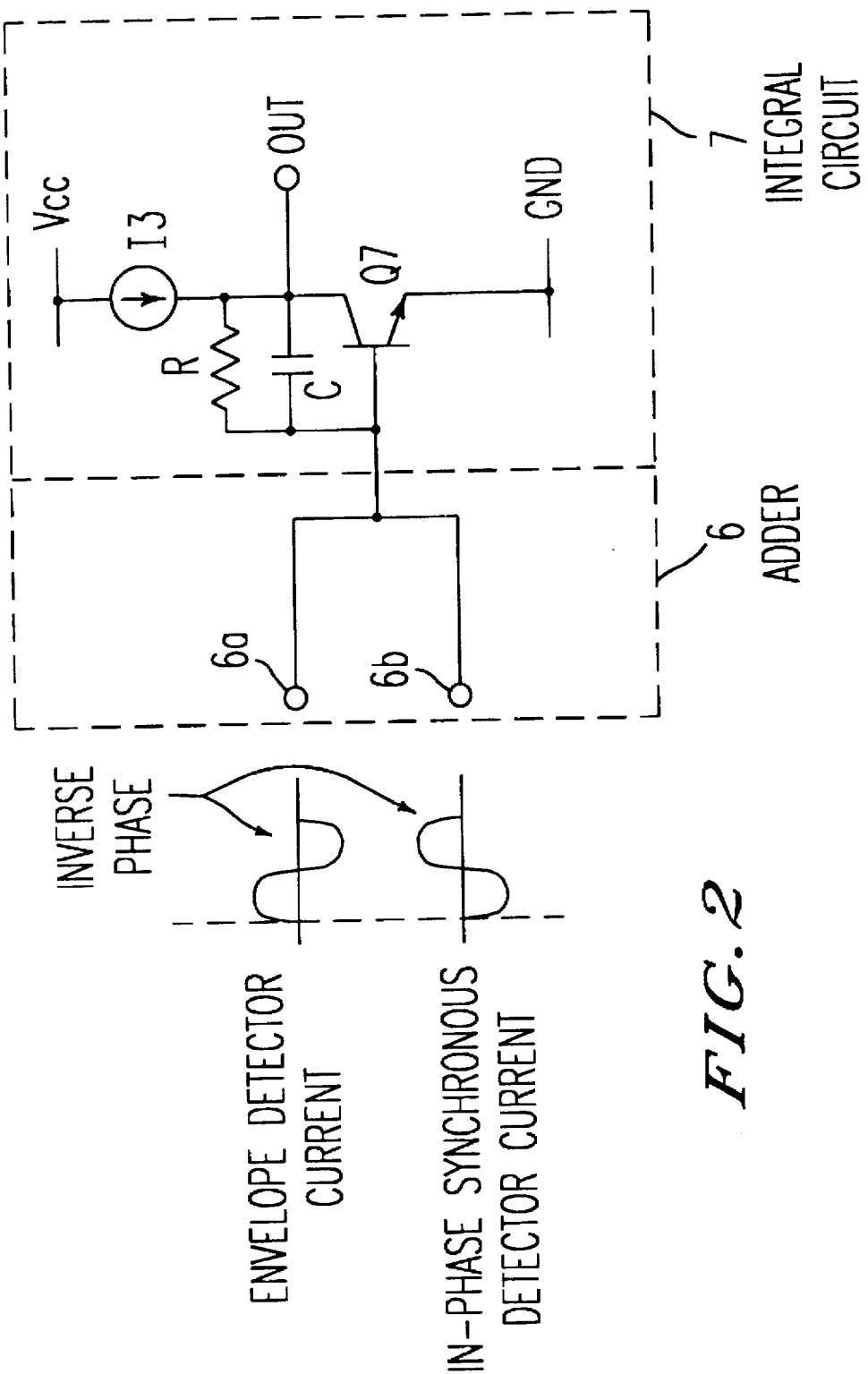
FIG. 2 is a circuit diagram of an example for the adder and the integration circuit for used in the AM stereophonic decoder in FIG. 1.

FIG. 2 is an example circuit diagram of the adder and the integration circuit for used in the AM stereophonic decoder of the present invention. The output current of the envelope detector is supplied to the first input 6a of the adder 6. The second input 6b, which has inverse phase to the first input comes from the current output type in-phase synchronous detector. By adding the two current inputs, a current output is obtained and supplied to the integral circuit 7 through the commonly connected output terminal.

The integral circuit 7 comprises of NPN transistor Q7 of which emitter is coupled to a ground node (GND), a constant current source I3, a resistor R and a capacitor C. The base of the transistor Q7 is coupled to the current output terminal of the adder 6. The constant current source I3 is coupled between the collector of the transistor Q7 and a source node Vcc. The resistor R and the capacitor C are coupled in parallel between the base and the collector of the transistor Q7.

According to the configuration of these circuits, when the output current level of −(1+L+R) of the in-phase synchronous detector is equal to the output current level of (1+L+R) of the envelope detector, an output of zero volt is supplied from the output terminal (OUT) of the integral circuit 7.

As mentioned before, all processing until the generation of a feedback signal to the VCA are made by the current mode only. Consequently, it can be possible to reduce the source voltage Vcc as low as around one volt. Since the forward voltage between the base and the emitter of the transistor Q7 is around 0.7 volts, it becomes possible to reduce the source voltage Vcc of the AM stereophonic decoder around one volt by appropriately selecting each biases.

Figure 3:
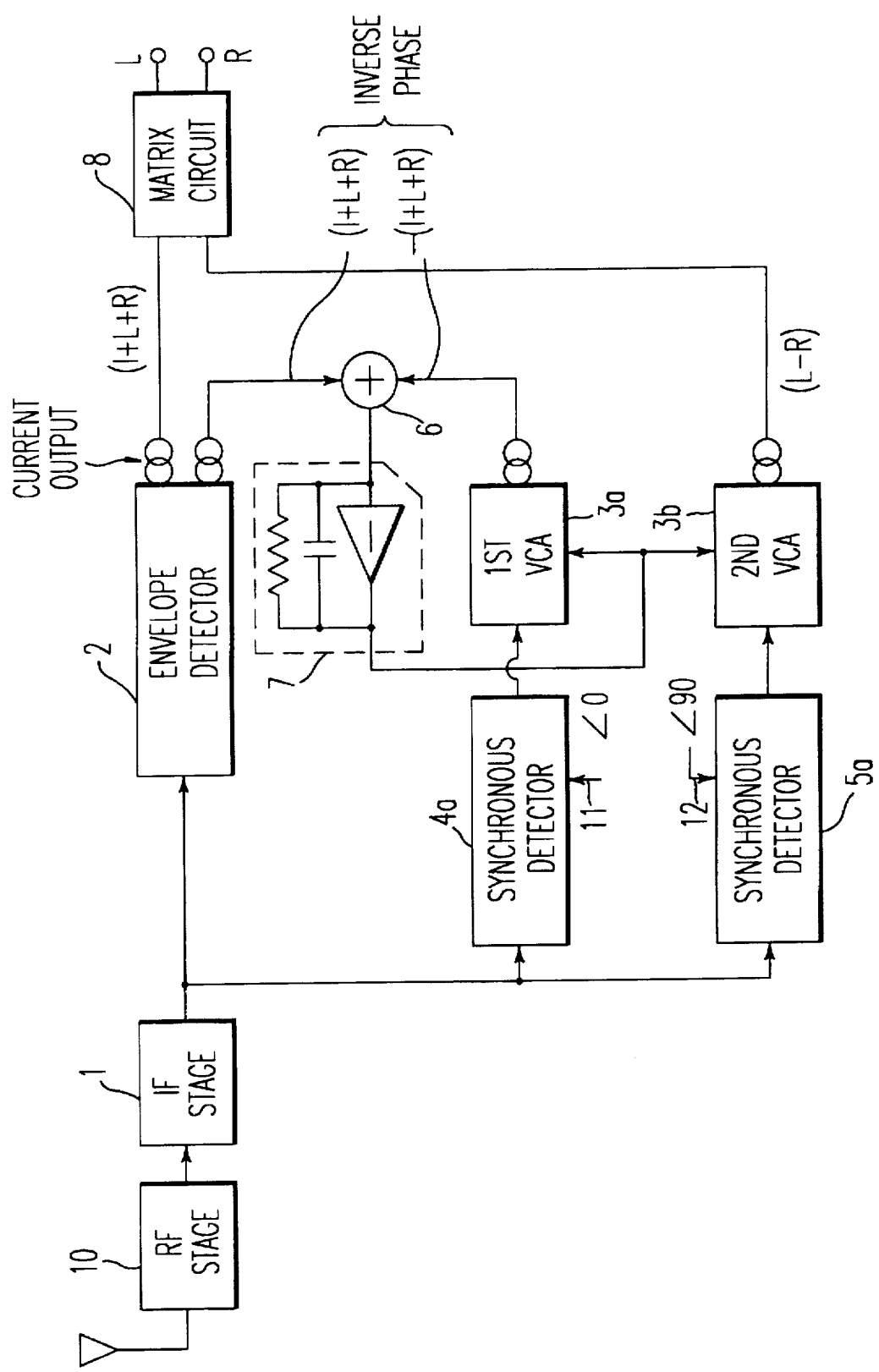
FIG. 3 is a block diagram showing another embodiment of the AM stereophonic decoder according to the present invention.

FIG. 3 is a block diagram showing another embodiment of the AM stereophonic decoder according to the present invention where like reference numerals refer to identical or corresponding parts in FIG. 1.

The IF signal from the IF stage 1 is supplied to an envelope detector 2 and two synchronous detectors 4a and 4b. The envelope detector 2 is a current output type envelope detector and provides a current of a (1+L+R) component of the AM signal. The output current (1+L+R) is supplied to the matrix circuit 8.

The second output current (1+L+R) of the envelope detector 2 is supplied to one input of an adder 6.

The IF signal is also to both of one input of two synchronous detectors 4a and 5b. The respective second input of the synchronous detectors 4 and 5 receives respectively a first and second reference signals 11 and 12 from a local oscillator (not shown).

The first reference signal 11 is directly supplied from a signal oscillator to the second input of the synchronous detector 4a. Thus, the detector 4a is an in-phase synchronous detector with at ∠0 (angular 0 degree). The output of the in-phase synchronous detector 4a is supplied to a first VCA 3a of an current output type. The first VCA supplies an inverted current output −(1+L+R) to the second input of the adder 6.

The IF signal is also detected in the second synchronous detector 5a with the second reference signal 12 which comes from the reference signal oscillator through a 90 degrees (π/2) phase shifter (not shown). Thus the second reference signal has ∠90 (angular 90 degrees).

The output voltage signal of the quadrature synchronous detector 5a is converted to a current mode in a second VCA 3b. And the output current (L−R) of the second VCA is supplied to the second input of the matrix circuit 8 which separates a right channel signal R and a left channel signal L from the AM stereophonic signal.

The output current of the adder 6 is supplied to the integrator 7. The feed back signal of the integrator 7 is supplied to the second input of the first VCA 3a and the second VCA 3b. By the feedback input signal of a voltage control, the output current (L−R) of the second VCA 3b is controlled so as to maintain an equal level to the output current (1+L+R) of the envelope detector 2.

In this second embodiment, it can achieve the low voltage operational AM stereophonic decoder. Thus, by properly setting biases, it can reduce the source voltage of the decoder around one volt.

Figure 4:
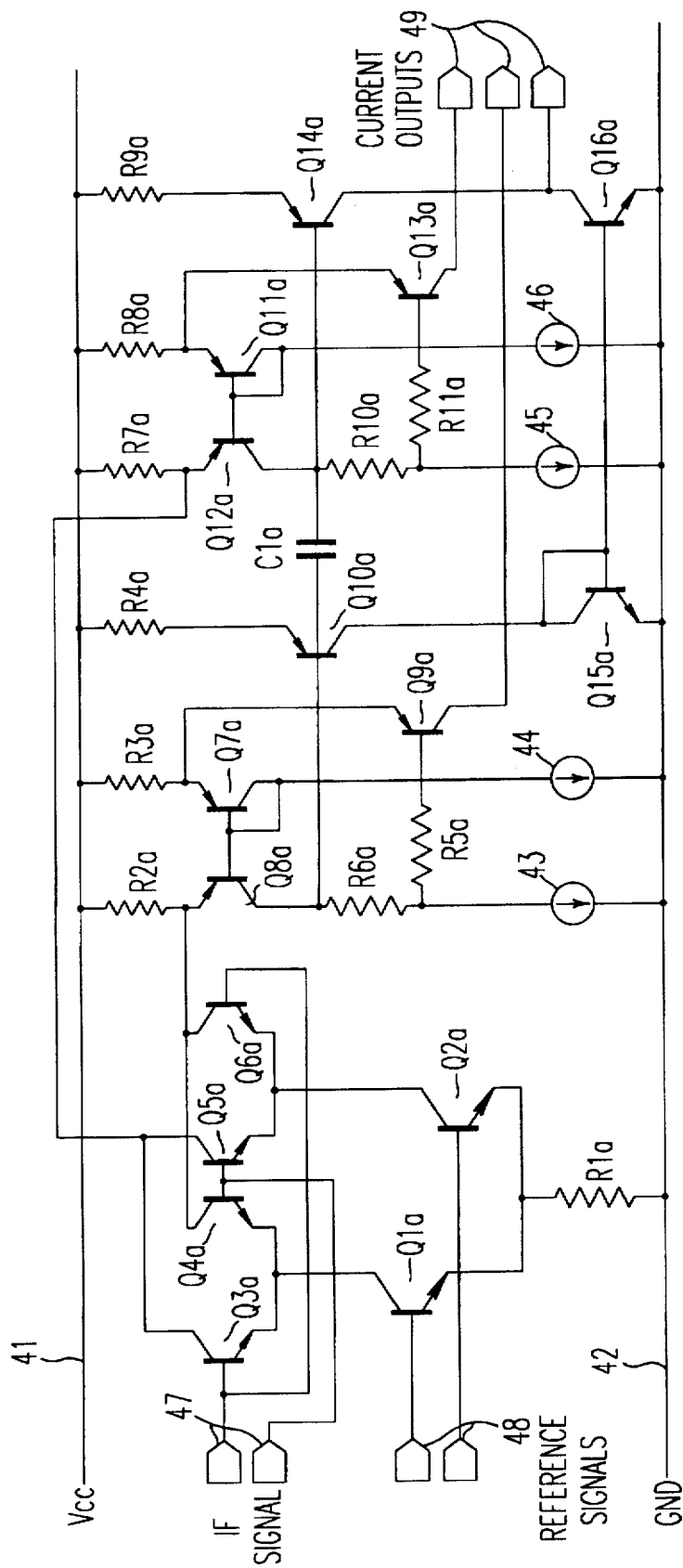
FIG. 4 is a circuit diagram showing an example of the electric current output type in-phase detector used in the AM stereophonic decoder in FIG. 1.

FIG. 4 is an example circuit diagram of the current output type synchronous detectors 4 and 5 in FIG. 1. A plurality of transistors Q1–Q14, resistors R1a–R9a, a capacitor C1a and a plurality of constant current sources 43–46 are provided between a source line 41 for supplying the source voltage Vcc and an earth line 42 for providing an earth potential (GND). The Q1a–Q6a, Q15a and Q16a are NPN transistors, and the Q7a–Q14a are PNP transistors.

The IF signals of the VCA 3 are respectively supplied to two pairs of differential amplifiers of transistors Q3a–Q4a and Q5a–Q6a through the first input node 47 of the respective synchronous detector. The second input node 48 receives the reference signal and the current output signals are provided through the current output node 49. When a reference signal ∠0 is supplied to the input node 48, an in-phase detected current output is obtained from the output node 49. And when a reference signal ∠90 is supplied to the input node 48, a quadrature detected current output is obtained from the output node 49.

Figure 5:
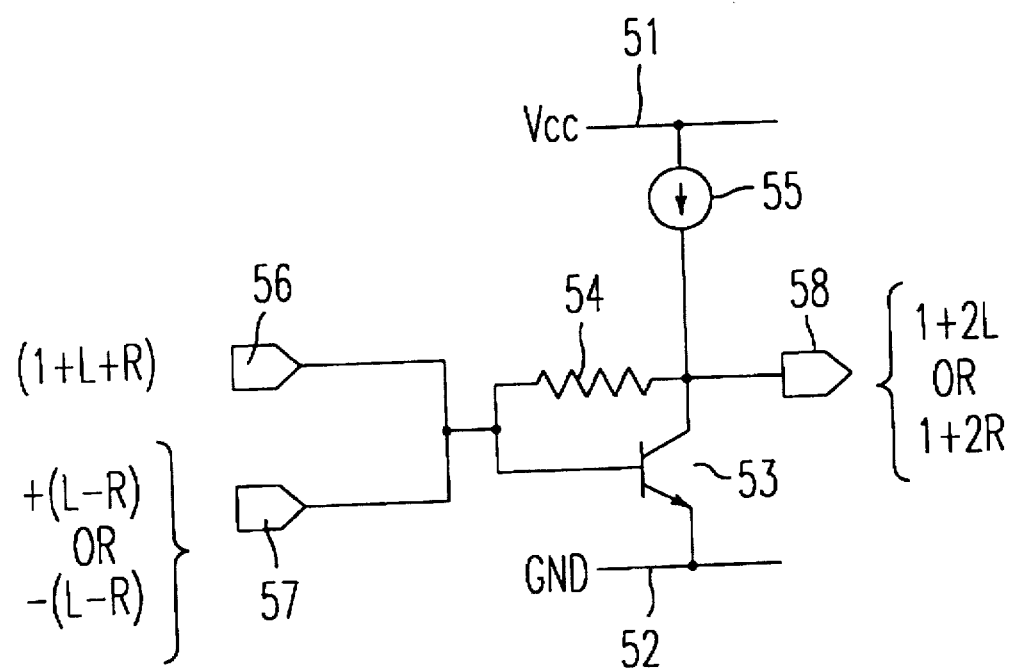
FIG. 5 is a circuit diagram showing an example of the electric current input type matrix circuit used in the AM stereophonic decoder in FIG. 1.

FIG. 5 is an example circuit diagram of the current input type matrix circuit 24 in FIG. 1. A NPN transistor 53, a resistor 54 and a constant current source 55 are provided between a source line 51 for supplying the source voltage VC and an earth line 52 for providing an earth potential (GOD). A first input node 56 and a second input node 57 are coupled to a connection terminal of the base of the transistor 53 and the resistor 54.

When an L channel signal is decoded, the (1+L+R) signal is supplied to the input node 56 and the (L−R) signal is supplied to the second input node 57. Then the (1+2L) signal is obtained from the output node 58. When an R channel signal is decoded, the (1+L+R) signal is supplied to the input node 56 and the −(L−R) signal is supplied to the second input node 57. Then the (1+2R) signal is obtained from the output node 58.

Figure 6:
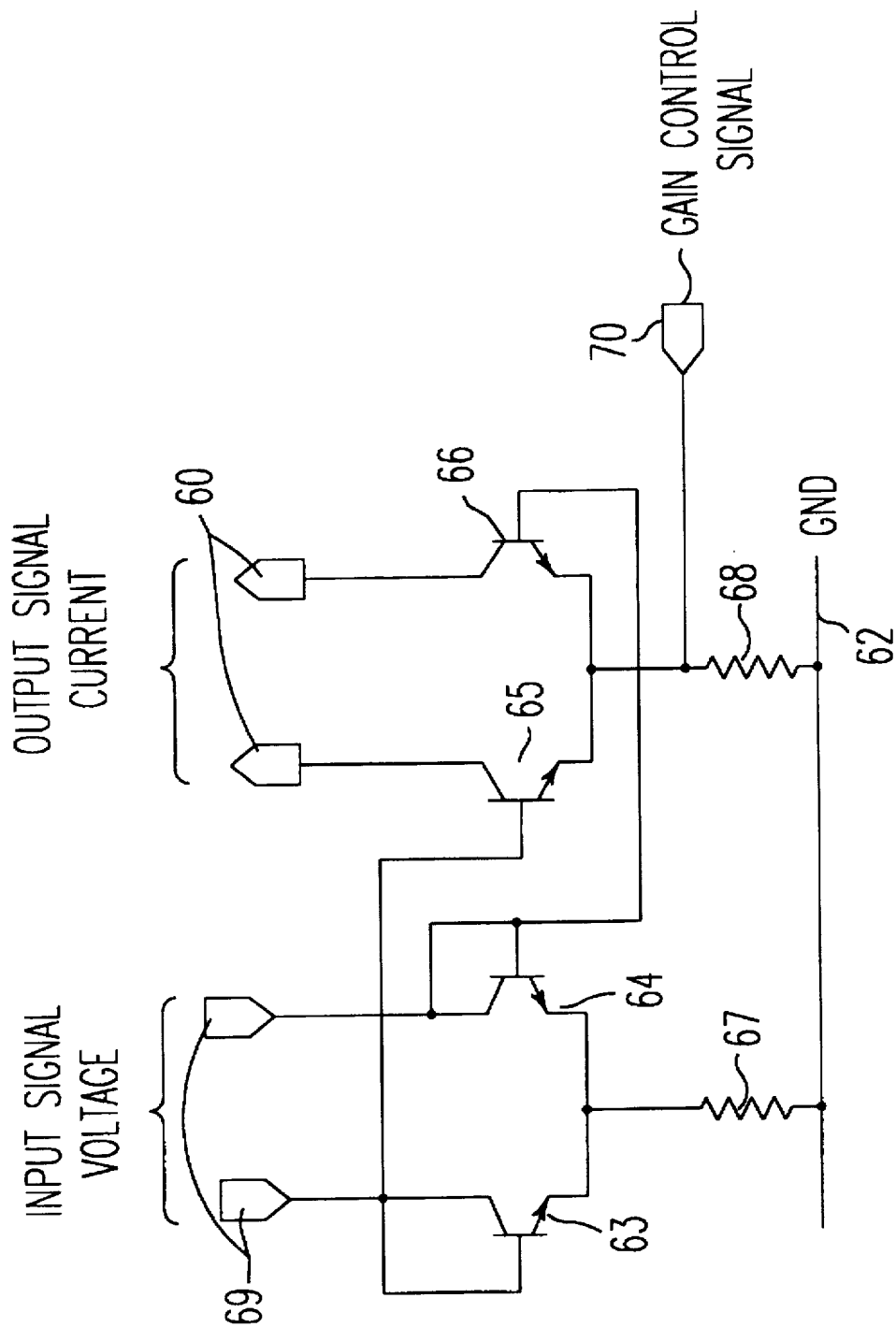
FIG. 6 is a circuit diagram showing an example of the electric current output type VCA circuit used in the AM stereophonic decoder in FIG. 3.
Figure 7:
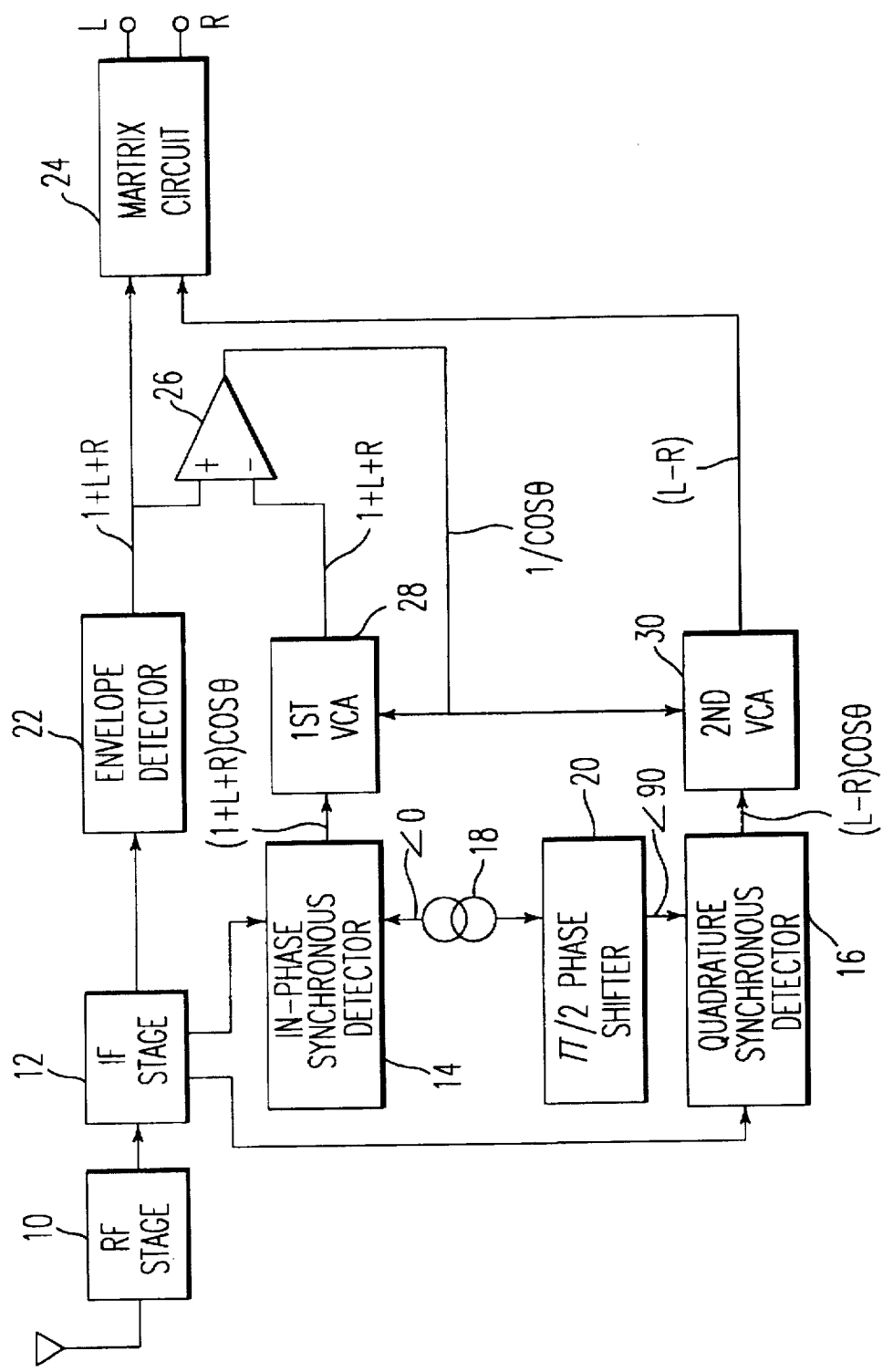
FIG. 7 is a block diagram for explaining the conventional AM stereophonic decoder.
Figure 8:
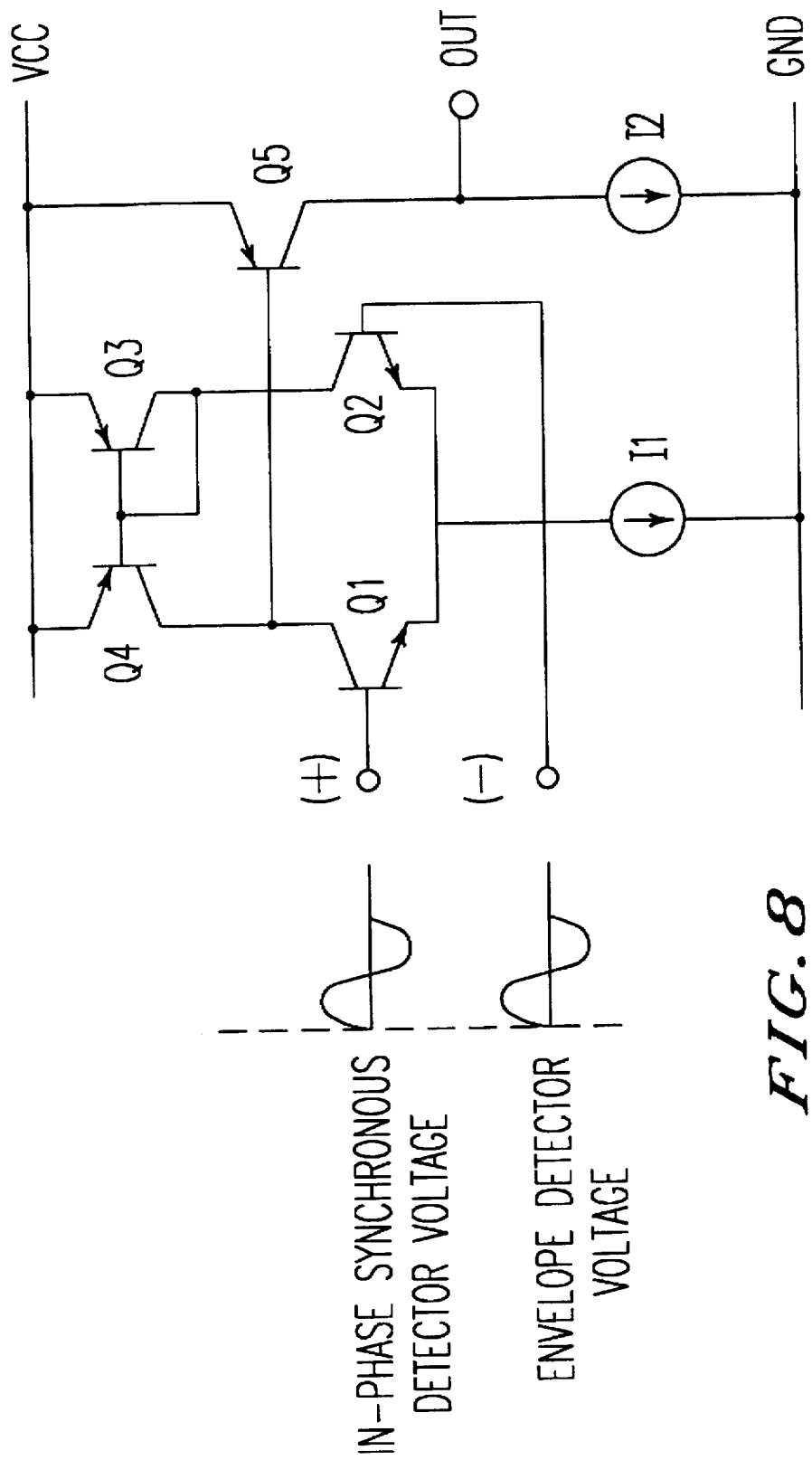
FIG. 8 is a circuit diagram of the voltage comparing circuit for using as the difference voltage detecting circuit in the conventional AM stereophonic decoder in FIG. 7.

FIG. 6 is an example circuit diagram of the current output type VCA circuit in FIG. 3.

The synchronously detected IF signal are supplied to two differential pairs of transistors 63–64, and 65–66 through a pair of input node 69. When a gain control signal comes from the integrator to a control node 70, a current output signal is obtained from a pair of current output node 60. In the first VCA 3a in FIG. 3, the output signal from the in-phase synchronous detector 4a is supplied to the input node 69, and the output current is obtained from the output node 60. In the second VCA 4a in FIG. 3, the output signal from the quadrature synchronous detector 5a is supplied to the input node 69, and the output current is obtained from the output node 60.

It will be clear that the present invention is well adapted to carry out and attain the ends and advantages mentioned as well as those inherent therein.

While a presently preferred embodiment has been described for the purpose of this disclosure, various changes may be made which are encompassed in the spirit of the invention disclosed and as defined in the appendix claims.

What is claimed is:

1. A compatible quadrature AM stereophonic decoder, comprising:

an envelope detector for detecting an IF signal of a compatible AM signal and providing a compatible monophonic (1+L+R) signal to a matrix circuit; and a combination of a VCA circuit and a synchronous detector for detecting the IF signal and providing a quadrature monophonic (L−R) signal to the matrix circuit for separating and demodulating left and right channel signals;

wherein:

the envelope detector is comprised of a current output type detector and the combination of the VCA circuit and the synchronous detector is also comprised so as to provide current output signals; and the VCA circuit is controlled by a feedback signal which comes from an adder for adding the current output of the envelope detector and the current output of the combination of the VCA circuit and another synchronous detector in order to maintain a same current level between the signals to the matrix circuit.

2. A compatible quadrature type AM stereophonic decoder for processing a received AM stereophonic signal and providing a pair of L and R signals through a matrix circuit, comprising:

an envelope detector;

an amplifying stage for providing an IF signal of the received AM stereophonic signal to the envelope detector and a VCA circuit;

the envelope detector for supplying a compatible monophonic (1+L+R) current signal which corresponding to a modulated component of the IF signal;

the VCA circuit for supplying a voltage control amplifying signal in response to an input of the IF signal;

an in-phase synchronous detector for detecting a carrier signal of the IF signal with a first reference signal which is in-phase to the carrier signal of IF signal and supplying an inverted −(1+L+R) current signal;

a quadrature synchronous detector for detecting a carrier signal of the IF signal with a second reference signal which is quadrature to the carrier signal of IF signal and supplying a quadrature (L−R) current signal;

an adder for adding the output current signal of the envelope detector and the output current signal of the in-phase synchronous detector; and an integrator for supplying a feedback voltage signal of the output current from the adder to the VCA.

3. A compatible quadrature type AM stereophonic decoder according to claim 2, wherein:

the integrator comprises of a NPN transistor of which emitter is coupled to an earth node and, a resistor element and a capacitor element which are parallel coupled;

a base of the NPN transistor receives the output current of the adder;

a constant current source is coupled between a source voltage and a collector of the NPN transistor; and the collector of the NPN transistor is coupled to the second input of the VCA for supplying the feedback signal from the adder.

4. A compatible quadrature type AM stereophonic decoder according to claim 2, wherein:

the in-phase synchronous detector and the quadrature synchronous detector are commonly comprised of two pair of differential amplifiers of NPN transistors of which bases are coupled to the output of the VCA circuit;

each of the differential amplifier comprises of a pair of NPN transistors of which emitters are commonly coupled with each other; and the first and second reference signals are respectively supplied to the respective commonly coupled emitters of the differential amplifier.

5. A compatible quadrature type AM stereophonic decoder according to claim 2, wherein:

the matrix circuit comprises of a NPN transistor, a constant current source and a resistor element;

a collector of the NPN transistor is coupled to a source voltage through the constant current source;

an emitter of the NPN transistor is coupled to an earth potential node;

a base of the NPN transistor receives the compatible monophonic signal or the quadrature monophonic signal; and the separated L or R channel signal is supplied through an output terminal which is coupled to the collector of the NPN transistor.

6. A compatible quadrature type AM stereophonic decoder for processing a received AM stereophonic signal and providing a pair of L and R signals through a matrix circuit, comprising:

an amplifying stage for providing an IF signal of the received AM stereophonic signal;

an envelope detector for supplying a compatible monophonic (1+L+R) current signal which corresponding to a modulated component of the IF signal;

a VCA circuit for supplying a voltage control amplifying signal in response to an input of the IF signal;

an in-phase synchronous detector for detecting a carrier signal of the IF signal with a first reference signal which is in-phase to the carrier signal of IF signal;

a first VCA circuit for receiving an output of the in-phase synchronous detector and supplying an inverted −(1+L+R) current signal;

a quadrature synchronous detector for detecting a carrier signal of the IF signal with a second reference signal which is quadrature to the carrier signal of IF signal;

a second VCA circuit for receiving an output of the quadrature synchronous detector and supplying a quadrature (L−R) current signal;

an adder for adding the output current signal of the envelope detector and the output current signal of the first VCA circuit; and an integrator for supplying a feedback voltage signal of the output current from the adder to the first and second VCA circuits.

7. A compatible quadrature type AM stereophonic decoder according to claim 6, wherein:

the first and second VCA circuits are commonly comprised of a first and a second differential amplifiers, each of the diffential amplifiers is comprised of two NPN transistors in which emittors are commonly mirror-coupled, and a first and a second base of the transistors in the first differential amplifier are respectively coupled to a first and a second base of the transistors in the second differential amplifier;

each collectors of the transistors in the first differential amplifier receives input voltage signal;

the mirror-coupled emittors of the second differential amplifier receives a gain control signal from the integrator; and each collectors of the transistors in the second differential amplifier supplies an output current signal.

* * * * *

UNITED STATES PATENT AND TRADEMARK OFFICE
CERTIFICATE OF CORRECTION

PATENT NO. : 5,706,350
DATED : January 6, 1998
INVENTOR(S) : Atsusi OGAWA, et al.

It is certified that error appears in the above-indentified patent and that said Letters Patent is hereby corrected as shown below:

On the title page, item [54], and at the top of column 1, the title should be:

--AM STEREOPHONIC DECODER--

Signed and Sealed this

Thirty-first Day of March, 1998

Attest:

BRUCE LEHMAN

Attesting Officer  Commissioner of Patents and Trademarks